United States Patent [19]
Boyd et al.

[11] 3,866,938
[45] Feb. 18, 1975

[54] CAMBER ADJUSTING MEANS

[76] Inventors: Elmer E. Boyd, 7559 E. 49th St., Bldg. 59, Apt. 112, Tulsa, Okla. 74145; Alvin S. Powell, 15300 E. Pine, Tulsa, Okla. 74116

[22] Filed: May 14, 1973

[21] Appl. No.: 360,128

[52] U.S. Cl. .............................. 280/96.2 B, 403/4
[51] Int. Cl. ............................................ B62d 17/00
[58] Field of Search ................ 280/96.2 B, 96.2 R; 287/DIG. 8; 403/4

[56] References Cited
UNITED STATES PATENTS

| | | | |
|---|---|---|---|
| 1,044,055 | 3/1912 | Johnson et al. ................ | 280/96.2 B |
| 2,115,919 | 5/1938 | Slack ............................. | 280/96.2 B |
| 2,556,767 | 6/1951 | McCann ......................... | 280/96.2 B |
| 3,163,441 | 12/1964 | Traugott ........................ | 280/96.2 B |
| 3,273,910 | 9/1966 | Willingshofer et al. ........ | 280/96.2 B |

*Primary Examiner*—Kenneth H. Betts
*Assistant Examiner*—Jack D. Rubenstein
*Attorney, Agent, or Firm*—Head & Johnson

[57] ABSTRACT

In a vehicle front end suspension system including a chassis forward cross-frame, a lower support arm and a pivot bolt extending from the cross-frame, the pivot bolt extending perpendicular to the longitudinal length of the cross-frame, improved means of adjustably supporting the lower support arm to the pivot bolt as a means of adjusting the front wheel camber including a bushing having a cylindrical external surface rotatably received in the opening of the lower support arm and having an opening therethrough eccentric to the cylindrical surface, the bushing receiving the pivot bolt in the longitudinal opening and means of rotatably positioning the bushing on the pivot bolt to longitudinally position the lower support arm.

1 Claim, 4 Drawing Figures

PATENTED FEB 18 1975  3,866,938

CAMBER ADJUSTING MEANS

BACKGROUND, SUMMARY AND OBJECTS OF THE INVENTION

The correct alignment of automobile front end suspension systems is very important to proper handling of the automobile and maximum tire wear. There are two basic alignment requirements. The first is tow in which is the regulation of the forward normal direction of travel of the rotating front wheels with the vehicle steering system directing the vehicle straight ahead. The second is the camber, or the slight inward tilt of the front wheels of the automobile. It is normally designed that the front wheels tilt inwardly slightly at the bottom relative to the top and if wear, distortion of frame supports as a result of striking objects such as chug holes or curbs occurs, the camber of the front wheels of an automobile may be distorted such that the proper inward tilt is not maintained. If the camber degenerates to the point wherein the wheels are outwardly inclined steering of the automobile is drastically impaired and the wear on the tires greatly increases.

While all automobiles include a system for correcting tow in, some do not include a means of adjusting camber. While the engineering design is such that the camber is correctly selected when the automobiles are manufactured, frequently as connecting parts wear or mishaps occur the camber angle changes with the result that handling and tire wear performance of the automobiles are worsened. This invention is directed towards a means of adapting standard automobile front suspension systems in a way to permit adjustment of camber.

It is therefore an object of this invention to provide improved means of adjustably pivotally supporting the front suspension system of an automobile to permit camber adjustment.

More particularly, an object of this invention is to provide improved means of adjustably pivotally supporting the lower support arm of an automobile front end suspension system as a means of adjusting the front wheel camber.

These general objects as well as more specific objects will be fulfilled in the following description and claims, taken in conjunction with the attached drawings.

DESCRIPTION OF THE VIEWS

DETAILED DESCRIPTION

Figure 1:
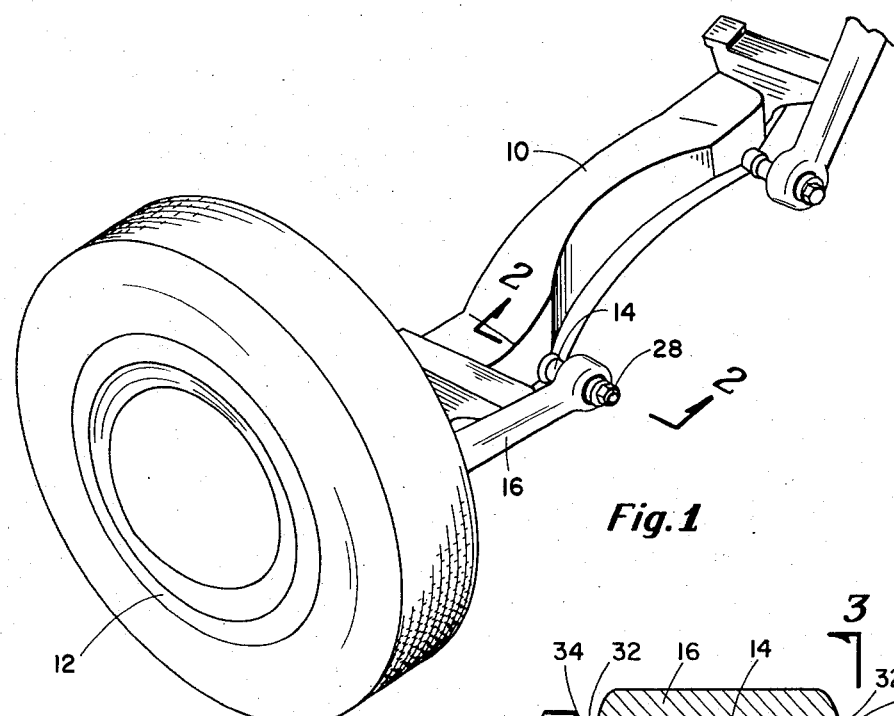
FIG. 1 is an isometric view of a portion of a front end suspension system of an automobile showing the improved means of adjustably pivotally supporting the lower support arm as a means of adjusting the front wheel camber.

Referring to the drawings and first to FIG. 1, a portion of an automobile front end suspension system is shown. The suspension system includes a cross-frame member 10. Each end of the cross-frame 10 includes means of pivotally supporting the vehicle front wheels, such as wheel 12, the wheel supporting means not being shown as such forms no part of the invention and since the wheel support means may vary greatly from one automobile manufacturing design to the next. The automobile suspension system includes means of adjusting the tow in of wheel 12, such means also not being shown as it forms no part of the invention.

Extending from the cross-frame 12 is a pivot bolt 14. The pivot bolt 14 extends generally perpendicular to the longitudinal axis of the cross-frame 10. Pivotally extending from pivot bolt 14 is a lower support arm 16. The function of the lower support arm 16 is to guide the lower end of the wheel support system and thereby the longitudinal extension or contraction of the lower support arm controls the camber or inward tilt of wheel 12.

Figure 2:
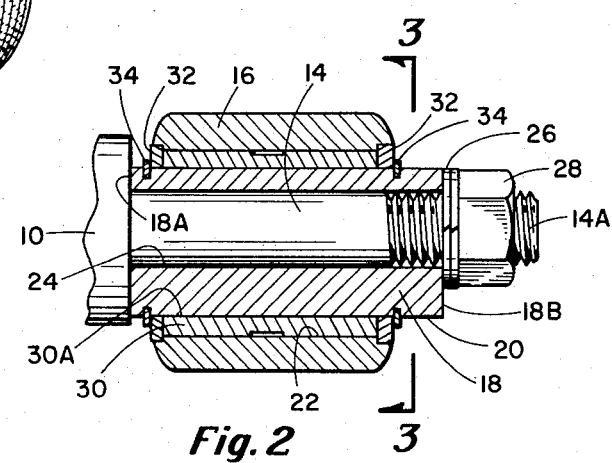
FIG. 2 is a cross-sectional view of the improved means of adjustably pivotally supporting the lower support arm as taken along the lines 2—2 of FIG. 1.

The lower support arm 14 is pivoted by a bearing arrangement about the pivot bolt 14. The suspension system described to this point is that which is standard and typical of many automobile designs in present use today. This invention is directed towards improvement in the system described including means of adjustably longitudinally positioning the lower support arm 16 so as to provide means of adjusting the camber of wheel 12. Referring to FIG. 2 the improvement which constitutes the invention is best seen. The pivot bolt 14 extends from cross-frame 10, the bolt being threaded at the outer end thereof, the threaded portion being indicated by numeral 14A. Received on the bolt 14 is a bushing 18. The bushing has a cylindrical external surface 20 which is rotatably received in an opening 22 in the lower support arm. The bushing has a longitudinal opening 24 therethrough, the axis of which is parallel to and eccentric of the axis of the external cylindrical surface 20.

The inner end 18A of bushing 18 butts against cross-frame 10. It can be seen that the cross-frame of FIG. 2, which contacts the bushing inner end may be an enlarged portion of pivot bolt 14 which is secured to the cross-frame. The outer end 18B of the bushing 18 is engaged by washers 26 which in turn are engaged by nuts 28 threadably retained on the outer threaded portion 14A of the pivot bolt.

While the lower support arm opening 22 may be received directly upon the external cylindrical surface 20 of bushing 18 the preferred arrangement includes the use of a tubular bearing member 30 received in opening 22, the bearing member 30 having an internal tubular opening 30A which receives the external cylindrical surface 20 of the bushing 18.

Means is provided for retaining the bearing 30 and support arm 16 on the bushing 18. This may include the use of washers 32 and keepers 34 inserted in cylindrical notches in the bushing. Obviously other means may be employed for retaining the lower support arm on the bushing.

Figure 3:
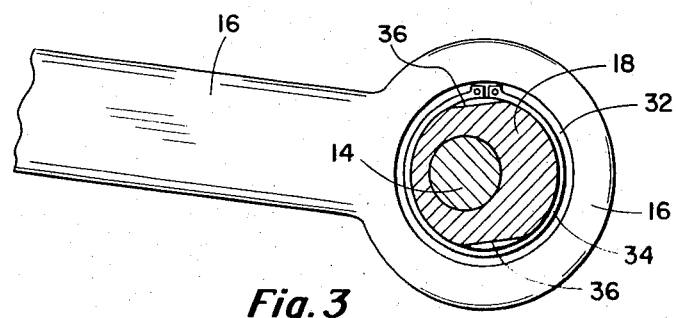
FIG. 3 is a cross-sectional view taken along the line 3—3 of FIG. 2.
Figure 4:
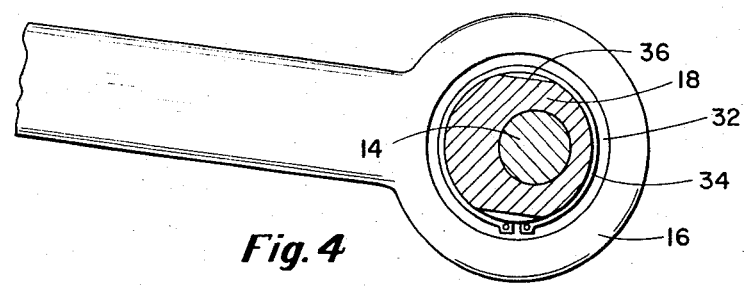
FIG. 4 is a cross-sectional view as shown in FIG. 3 but showing the bushing positioned 180° from that shown in FIG. 3 to illustrate means of adjustably longitudinally positioning the lower support arm.

As shown in FIG. 2 the longitudinal length of bushing 18 is greater than that of the opening 22 in lower support arm 16 so that a portion of the bushing extends outwardly beyond the lower support arm. As shown in FIG. 3, this outwardly extending portion is provided with opposed wrench flats 36 by means of which the bushing may be rotated.

OPERATION

When it is desired to adjust the camber of a vehicle the mechanic loosens bolt 28. By means of a wrench applied to flats 36 on bushing 18, the bushing may be rotatably positioned. As the bushing is rotated the longitudinal position of lower support arm 16 varies towards or away from the wheel support. In this way the camber of the wheel may be adjusted so that the proper inward tilt of the front wheels of the vehicle may be attained. Once the proper longitudinal positions of lower support arm 16 is achieved nut 28 is tightened. This clamps the bushing in the selected position and thereby retains the lower support arm 16 in the selected longitudinal position, insuring proper camber. If the camber should go out of adjustment, such as by wear of parts, or by stress on parts occasioned by the front wheel 12 striking an object in the road, the camber again can be easily adjusted.

While the invention has been described with a certain degree of particularity it is manifest that many changes may be made in the details of construction and the arrangement of components without departing from the spirit and scope of this disclosure. While the invention has been described with a certain degree of particularity it is understood that the invention is not limited to the embodiment set forth herein for purposes of exemplification, but is limited only by the scope of the attached claim or claims, including the full range of equivalency to which each element thereof is entitled.

What is claimed:

1. In an automobile front end suspension system including a chassis forward cross-frame, a lower support arm and a pivot bolt extending from the cross-frame, the pivot bolt extending perpendicular the longitudinal length of the cross-frame and being threaded at the outer end, the inner end of the lower support arm having an opening therethrough, the axis of said opening being perpendicular the longitudinal length of the lower support arm, improved means of adjustably pivotally supporting the lower support arm to the pivot bolt as a means of adjusting the front wheel camber, comprising:

a bushing having a cylindrical external surface rotatably received in said opening in the lower support arm, said bushing having a longitudinal opening therethrough, the axis of which is parallel the bushing cylindrical axis, the bushing opening being eccentric to the cylindrical exterior, the bushing receiving said pivot bolt by said longitudinal opening, the length of said bushing measured parallel the cylindrical axis being greater than the thickness of said lower support arm measured parallel the axis of said opening therethrough whereby a portion of said bushing extends exteriorly on both sides of said support arm, and wherein said bushing includes opposed wrench flats on the external cylindrical surface of said portion of said bushing extending exteriorly and rearwardly of said lower support arm, said flats serving as a means of rotatably positioning said bushing on said pivot bolt to thereby longitudinally position said lower support arm, a nut threadably received on said threaded outer end of said pivot nut, said bolt when inwardly threadably advanced serving to directly clamp said bushing against said cross-frame to prevent the rotation thereof; and a tubular bearing interposed between said bushing and said lower support arm opening.

* * * * *